No. 705,771. Patented July 29, 1902.
A. & L. LUMIÈRE.
PROJECTING APPARATUS.
(Application filed Oct. 25, 1901.)

(No Model.) 2 Sheets—Sheet 1.

WITNESSES:
Isabella Waldron
Adelaide Claire Gleason

INVENTORS.
Auguste Lumière
Louis Lumière
BY
Richards
ATTORNEYS.

No. 705,771. Patented July 29, 1902.
A. & L. LUMIÈRE.
PROJECTING APPARATUS.
(Application filed Oct. 25, 1901.)
(No Model.) 2 Sheets—Sheet 2.

WITNESSES:

INVENTORS
Auguste Lumière
Louis Lumière
BY
Richards & Co.
ATTORNEYS

UNITED STATES PATENT OFFICE.

AUGUSTE LUMIÈRE AND LOUIS LUMIÈRE, OF LYONS, FRANCE.

PROJECTING APPARATUS.

SPECIFICATION forming part of Letters Patent No. 705,771, dated July 29, 1902.

Application filed October 25, 1901. Serial No. 79,982. (No model.)

*To all whom it may concern:*

Be it known that we, AUGUSTE LUMIÈRE and LOUIS LUMIÈRE, citizens of France, residing at Lyons, France, have invented certain new and useful Improvements in Projecting Apparatus, of which the following is a full, clear, and exact description, and for which we have made application for patent in France, dated May 1, 1901.

The invention has for its object an improved arrangement of the apparatus employed for the projection onto a cylindrical surface of panoramic images obtained by processes such as described in our application for patent filed March 20, 1901, under Serial No. 52,077.

The improved apparatus is represented in the accompanying drawings, in which—

Figure 1:
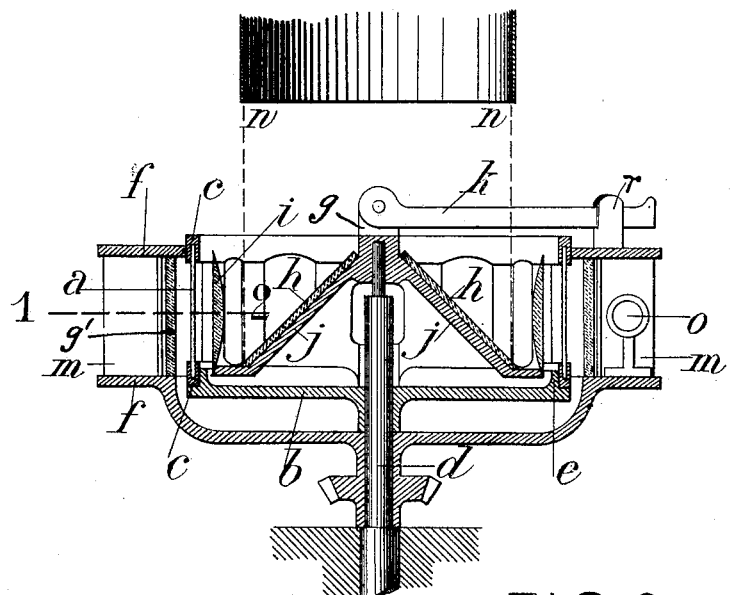
Figure 2:
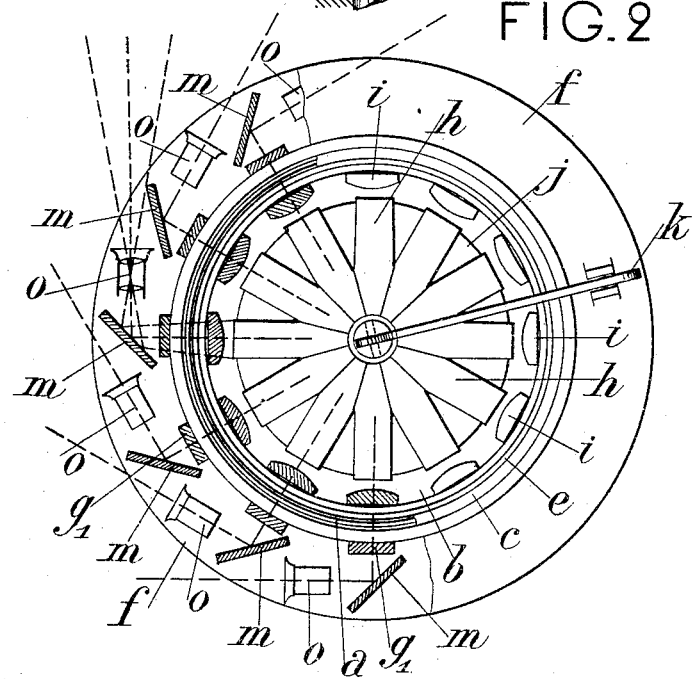

Figure 1 is a vertical axial section; and Fig. 2 is a plan, partly drawn in section on the line 1 2 of Fig. 1. The arrangement represented in Figs. 3, 4, and 5 shows the principle which has been utilized.

Figure 3:
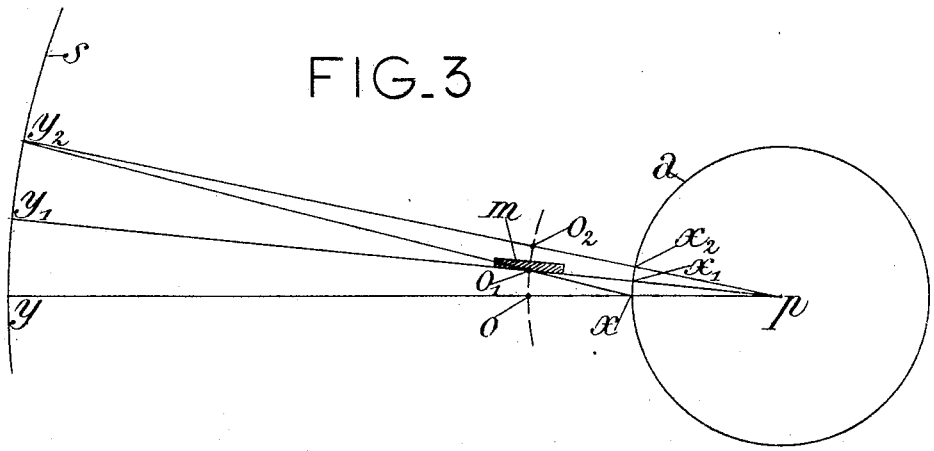

In Fig. 3, $a$ is a cylindrical transparent film, lighted inside, bearing a panoramic picture which has to be projected upon a cylindrical screen $s$, having the same center $p$ like the film. We use to this purpose an objective which turns around the center $p$ outside of the film and which we represent by its nodal point $o$. Point $x$, placed above $o\,p$, will be projected on the screen in $y$ on the extension of $o\,p$. If now objective $o$ is made to turn the little quantity $o\,o'$, then the projection of point $x$ will be displaced on the screen and will be in $y^2$. However, if a plane mirror $m$ is placed in $o'$ the projection of point $x$ can be brought back to $y$. The calculation shows that if the reflecting-surface of the mirror passes through axis $p\,o'$ of the objective and if there exists at the same time the proportion $\dfrac{p\,y}{p\,x} = \dfrac{o\,y}{o\,x}$ ray $x\,o'$ will be reflected precisely in $o'\,y$. If mirror $m$ is invariably fixed to the objective while it travels from $o$ to $o'$, the projection of point $x$ will remain thus in $y$ during its whole course. It will be likewise seen that the projection of $xi$ will remain in $y'$ as long as the objective will travel from $o'$ to $o^2$. This holds good as long as arc $x\,x^2$ is small enough to be confounded with its chord—that is to say, within limits which will suffice for practical purposes.

Figure 4:
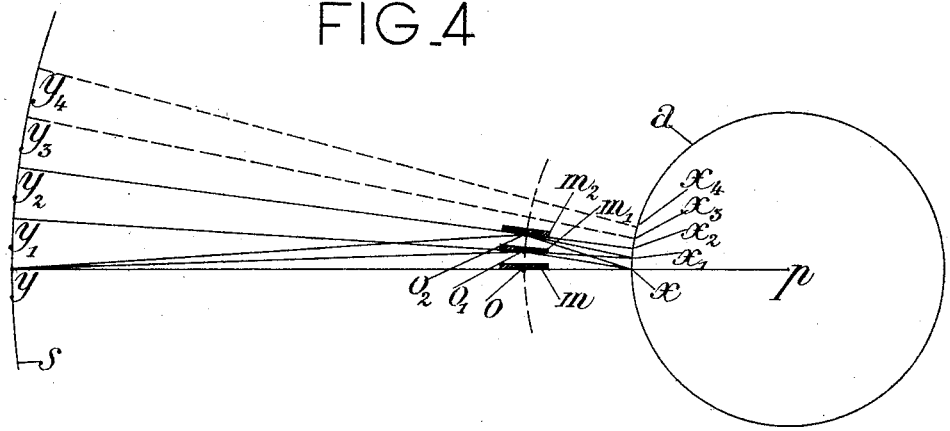
Figure 5:
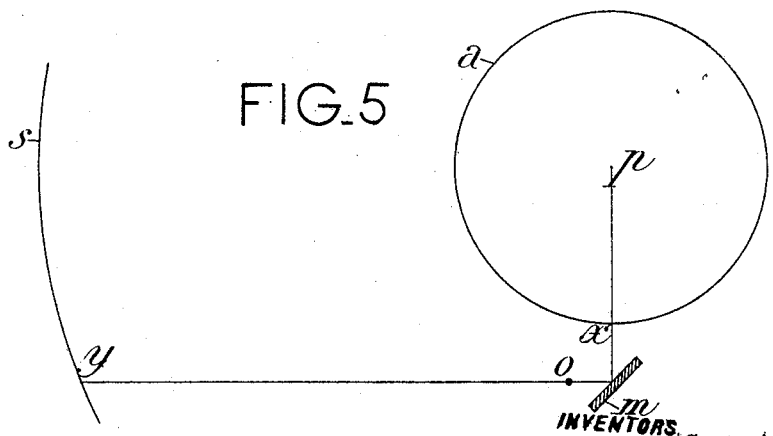

If we consider now in Fig. 4 several points $x\,x'\,x^2$ of the picture which has to be projected and mirror $m$ connected with the objective, we find that in the position $o$ of the objective point $x$ is projected directly in $y$. When the objective has arrived in $o'$, point $x'$ is projected directly in $y'$, while point $x$ continues to be projected in $y$ by reflexion on $m'$. When the objective has arrived in $o^2$, point $x^2$ is projected directly in $y^2$, while points $x'\,x$ continue to be projected in $y'\,y$ by reflexion on $m^2$. The projection of surface $x\,x'\,x^2$ of the picture has heretofore remained fixed on the screen while the objective has traveled from $o$ to $o^2$. If the objective continues its movement, the successive surfaces $x^2\,x^3\,x^3\,x^4$ of the picture will be projected in the same manner on the screen $y^2\,y^3\,y^3\,y^4$, and after a complete revolution of the objective the entire surface of the picture will have been projected on the screen by successive parts in their natural order. If the objective turns fast enough, so that every part of the projection remains on the retina during one complete revolution, then the entire projection will be visible in a continuous manner upon the screen, where it remains fixed.

Mirror $m$ in Fig. 3, which passes through the nodal point of the objective, cannot be easily applied, and we have only shown it in order to simplify the demonstration. For practical purposes we use a mirror at forty-five degrees, $m$ in Fig. 5, placed on the passage of the projected rays between picture $a$ and objective $o$. Said mirror produces exactly the same effect like the mirror in Fig. 1. The straight ray $p\,g$, Fig. 3, is replaced by the broken ray $p\,m + m\,y$ and ray $o\,x$ by $o\,m + m\,x$. Consequently it will be necessary to obtain $\dfrac{p\,m + m\,y}{p\,x} = \dfrac{o\,x}{o\,m + m\,x}$.

In order that the objective turning-around picture $a$ may not attain a too high speed, there may be arranged around said picture a certain number of objectives—for example, twelve, as shown in Figs. 1 and 2. Each objective $c$, provided with its redressing-mirror $m$, will yield on the screen a fixed projection of the picture, so that it will be possible to cause these projections to succeed at the same speed with a speed of rotation being twelve times smaller.

The apparatus is mounted around a fixed vertical axle $d$, on which is keyed a plate $b$. The film $a$, carrying the view to be projected, being held in a cylindrical form by metallic rings $c\ c$, is placed concentrically with the axle $d$ upon the fixed plate $b$, on which it is centered by an annular flange $e$.

The objectives $o\ o$, used for the projection, are fixed to a wheel $f$, revolving exteriorly of the film. Various numbers of objectives can be used, twelve being represented in the drawings. A correcting arrangement is adopted, consisting of a mirror inclined to a plane of forty-five degrees and placed between the objective $g'$ and the view to be projected. The objectives are therefore arranged tangentially to the wheel $f$, and the rays coming from the image traverse them after their reflection on the correcting-mirrors $m\ m$.

The illumination of the film is obtained by a pencil $n\ n$ of parallel luminous rays falling vertically to the center of the apparatus upon mirrors $h\ h$, inclined to forty-five degrees and carried by a pyramidal support $j$, which rotates at the same speed as the exterior wheel $f$. The mirrors $h$ are rectangular and of equal number to that of the objectives, and each of them illuminates only the portion of the image which can be clearly projected by the corresponding objective. Condensers $i$ accompany each mirror and turn with them.

Drum $f$, carrying the objectives $o$ and the mirrors $m$, is put in motion by any kind of motor and turns around the fixed film $a$. The lighting system, composed of mirrors $h$ and of condensers $i$, turns at the same speed within said film, and in order to render said movements identical drum $f$ and support $j$ are connected by lever $k$, passing above the film. In order that the film may be exchanged, if this should be necessary, lever $k$ is articulated on top of the support $g$ and engages with its other end in a fork $r$, fastened to a suitable place of drum $f$. If the apparatus thus arranged is placed in the center of a cylindrical screen and the relations indicated aforesaid established between the rays of the cylinder-image and the cylinder-screen, on the one hand, and between the coöperating foci of the objectives, on the other hand, each point of the view will be projected on a fixed point of the screen by each of the objectives passing before this point—that is to say, with the arrangement shown in the drawings twelve times per rotation—and each time during a period equal to that of the illumination of the said point—that is to say, during the passage before this point of one of the mirrors $h$. Therefore only a moderate speed is required to render the impression continuous.

What we claim as our present invention, and desire to secure by Letters Patent, is—

In an apparatus for the projection of panoramic photographic images, the combination of a plate $b$ keyed on a fixed vertical axle and carrying the image to be projected, a wheel $f$ capable of revolving around the said axle on the exterior of the image and carrying a plurality of objectives accompanied by their correcting-mirrors $m$, and an illuminating apparatus capable of revolving in the interior of the film at the same speed as the objectives and comprising, in front of each objective, a mirror $h$ inclined at an angle of forty-five degrees and a condenser $i$, substantially as herein set forth.

In testimony whereof we affix our signatures in presence of two witnesses.

AUGUSTE LUMIÈRE.
           LOUIS LUMIÈRE.

Witnesses:
  GASTON YEAUNIAUX,
  MARIN VACHON.